Figure 1:
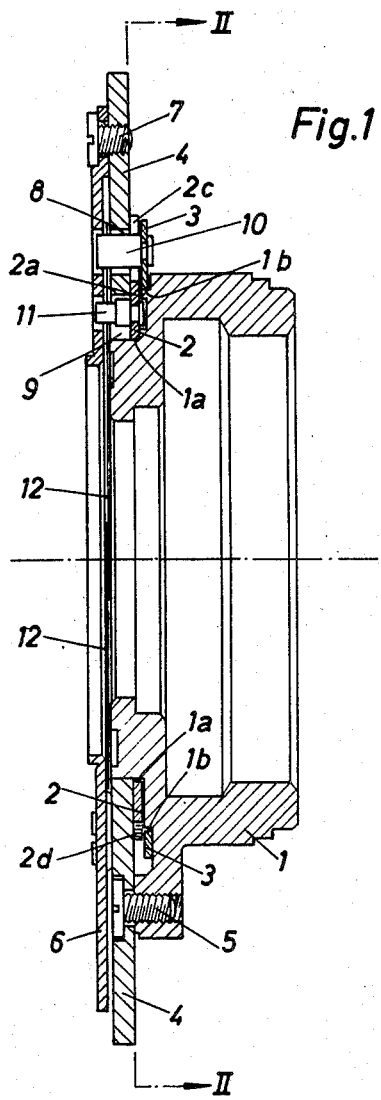

Feb. 16, 1965 G. KIPER 3,169,463
LIGHT CONTROLLING STRUCTURE FOR CAMERAS AND THE LIKE
Filed July 18, 1961 2 Sheets-Sheet 2

INVENTOR.
GERD KIPER

United States Patent Office 3,169,463
Patented Feb. 16, 1965

3,169,463
LIGHT CONTROLLING STRUCTURE FOR CAMERAS AND THE LIKE
Gerd Kiper, Unterhaching, near Munich, Germany, assignor to Agfa Aktiengesellschaft, Leverkusen-Bayerwerk, Munich, Germany
Filed July 18, 1961, Ser. No. 124,971
Claims priority, application Germany, July 23, 1960, A 15,352
5 Claims. (Cl. 95—64)

The present invention relates to light-controlling structures such as shutters, diaphragms, and the like used, for example, in photographic devices.

In structures of this type it is conventional to provide around the optical axis a plurality of blades which are actuated by a pair of rings so that the blades will form an aperture whose size is determined by the angular movement of the rings one with respect to the other. Because it is essential to have such rings absolutely centered with respect to each other and to guide them for movement, extremely expensive bearing structures are required and where the centering is even slightly inaccurate the result is jamming and sometimes tearing or deforming of the blades so that the structure is no longer useful.

It is therefore a primary object of the present invention to provide a structure which will overcome the above drawbacks.

A further object of the present invention is to provide a structure of the above type wherein the blade-controlling rings are very accurately centered so that the structure will operate reliably.

A further object of the present invention is to provide a structure of the above type where the bearings which support the rings for turning movement of an extremely simple construction and where in addition the centering of the rings is brought about in a completely accurate and at the same time extremely simple manner.

Still another object of the present invention is to provide a structure where the stress on the blades themselves is at an absolute minimum so that the likehood of damage to the blades is greatly reduced, as compared to known structures.

A still further object of the present invention is to provide a structure where the friction of resistance to turning of the pair of blade-controlling rings is substantially equal for the two rings.

Still another object of the present invention is to provide a structure of the above type which while being far less expensive than conventional structures is at the same time even more accurate and reliable in operation.

With the above objects in view the invention includes, in a light-controlling device which may take the form of a diaphragm, shutter, or the like of a photographic apparatus, a plurality of blades distributed about an optical axis and cooperating to form an aperture through which light passes along the optical axis. A pair of rings are operatively connected to these blades to control the latter according to the angular position of these rings one with respect to the other, these rings being concentrically arranged about the optical axis. In accordance with the present invention both these rings are located on the same side of the blades, so that many of the above drawbacks, which result from location of the conventional blade-operating rings on opposite sides of the blades, are avoided.

Figure 2:
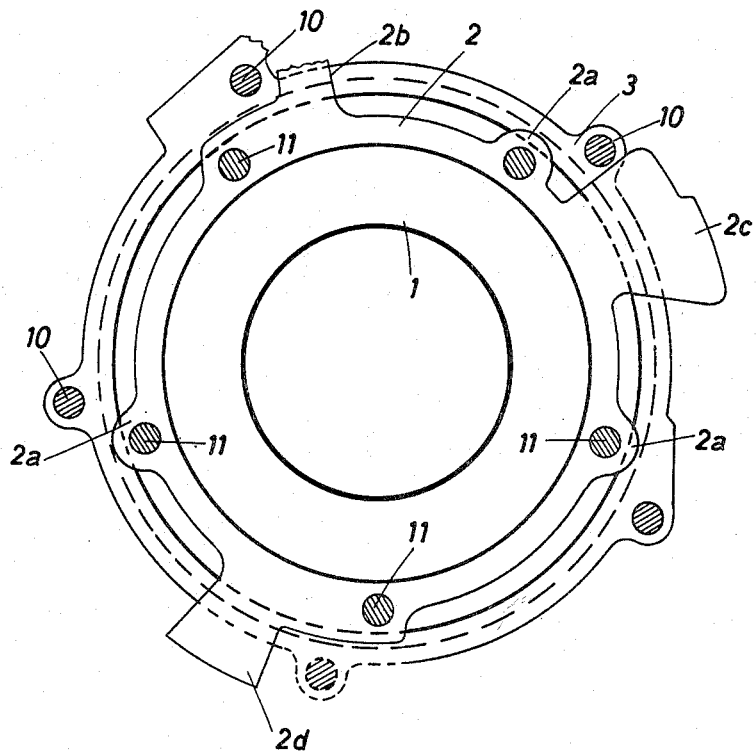

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional elevation of a light-controlling structure according to the present invention, the section of FIG. 1 being taken in a plane which includes the optical axis; and FIG. 2 is a transverse, partly sectional view of the structure of FIG. 1 taken along line II—II of FIG. 1 in the direction of the arrows.

Referring to the drawings, there is shown therein an annular support member 1 which is of a circular configuration and which has its axis coinciding with the optical axis which passes centrally through the annular support member 1. This annular support member 1 may have the objective or parts thereof screwed or otherwise fastened thereto, or the annular support member 1 may itself carry lenses of the objective. The annular support member 1 is formed with a pair of annular bearing surfaces 1a and 1b, and it will be noted that the annular support member 1 is stepped so that the bearing surface 1b is of a greater diameter than and axially displaced with respect to the annular bearing surface 1a which is of a smaller diameter than the bearing surface 1b. These bearing surfaces 1a and 1b which concentrically surround the optical axis serve to support and guide the blade-operating rings 2 and 3, respectively, for rotary movement. Thus, it will be seen that the blade-operating rings 2 and 3 concentrically surround the optical axis and are positioned both radially and axially by the bearing surfaces 1a and 1b of the annular support member 1. In this way a simple bearing structure which at the same time very accurately centers the rings 2 and 3 is provided. These rings 2 and 3 are operatively connected in a manner described below to the blades 12 which may form the blades of a shutter or a diaphragm, and in a manner well known in the art the rings 2 and 3 are turned one with respect to the other so as to actuate the blades 12 and thus regulate the size of the aperture through which light passes along the optical axis. Of course, in the case of a shutter, the blades 12 in their rest position completely close the objective so that light cannot pass along the optical axis and when the rings are actuated the blades 12 will move so as to provide an opening which is then closed according to the preselected exposure time, while in the case of a diaphragm the blades 12 will of course be adjusted by turning of one of the rings with respect to the other so as to provide an aperture of predetermined size. Where the structure is used as a shutter, the blades 12 also provide an aperture through which light passes, but this aperture is only momentarily formed and then immediately closed according to the particular exposure time which is provided.

It will be noted from the drawings that the blade-controlling rings 2 and 3 are axially and radially offset or displaced with respect to each other and the ring 3 is of a larger diameter than the ring 2 and extends radially beyond the latter.

A plate 4 is fixed to the annular support member 1 as by the screw members 5, and it will be noted that this plate 4 cooperates with the bearing surface 1a to prevent axial movement of the ring 2. This ring 2 has, as described below, radial projections overlapping the ring 3, so that these overlapping portions of the ring 2 cooperate with the bearing surface 1b to prevent axial movement of the ring 3. An additional plate 6 is connected as by screws 7 to the plate 4 so as to define therewith the space in which the blades 12 are accommodated, and the plate 4 is formed with cutouts 8 and 9 accommodating the pins 10 and 11 which are respectively fixed to the rings 3 and 2 and which respectively extend into cutouts formed in the blades 12. For example, the blades 12 may be pivotally connected to the ring 3 as by being formed with openings into which the pins 10 extend, while the blades may be formed with elongated slots of predetermined curvature receiving the pins 11 so that in this way, in a manner well known in the art, the turning of the blades by the rings 2 and 3 with respect to the other will cause the blades 12 to move so as to provide an aperture either of a predetermined size in the case of a diaphragm or an aperture which opens up to a predetermined size and is then closed in the case of a shutter. It will be noted that the plate 6 is also formed with openings aligned with openings 8 and 9 for accommodating the free ends of the pins 10 and 11.

It will be noted that in accordance with the present invention the pair of blade-controlling rings 2 and 3 are both arranged on the same side of the blades 12. This is in sharp contrast with conventional structures where the blade-controlling rings are arranged on opposite sides of the blades. With the latter arrangement the bearings for the rings and the accurate centering thereof is far more difficult and costly than the structure of the invention according to which the rings 2 and 3 are on the same side of the blades 12 and are supported by bearings 1a and 1b, respectively, which are inexpensive to manufacture and at the same time which serve very accurately to center the rings.

In the illustrated embodiment of the invention, as is shown particularly in FIG. 2, the ring 2 which is of smaller diameter and which fixedly carries the pivot pins 11, has the radial projections 2a, 2b, 2c, 2d which extend into overlapping relationship with respect to the ring 3, as described above. Thus, as is shown particularly in FIG. 2, the ring 3 is not completely overlapped by the ring 2, but instead is only overlapped by the projections 2a–2d. Furthermore, the configuration of the outer peripheries of the rings 2 and 3 is such that the pins 10 which are fixed to the ring 3 are free to operate without interference in the free spaces provided by the disclosed contour of the ring 2, and thus it is unnecessary to form the ring 2 with special slots for accommodating the pins 10.

It should be noted, in this connection, that a particular advantage resides in fixing the pins 10 and 11 to the rings 3 and 2, respectively, rather than fixing the pins to the blades 12 and forming the rings with openings to receive the pins, as is conventional. The advantage of the arrangement shown in the drawings and described above is that the stresses on the thin blades 12 are reduced to a minimum by fixing the pins to the rings rather than to the blades, and in this way also the possibility of jamming or undesirable deformation of the blades is reliably avoided.

It will also be noted that with the arrangement of the rings 2 and 3 on the same side as the blades 12, it is impossible for the ends of one set of pins to interfere with the movement of one of the rings. Furthermore, it will be noted that with the disclosed arrangement, where the rings 2 and 3 are not located in the same plane, it is possible, in spite of the different diameters of the rings 2 and 3, by proper choice of the areas of the projections 2a–2d which engage the ring 3, for example, to provide substantially equal frictional resistance to turning of both of the rings 2 and 3, which would not be the case where these rings are located in the same plane, although it is, of course possible, to locate these rings in the same plane without departing from the scope of the present invention. Moreover, it will be seen that with the disclosed arrangement additional or special bearing rings or sleeves for the individual rings 2 and 3 are completely unnecessary, so that the assembly of the parts is much easier than with conventional structures and the manufacturing costs are much lower.

While the above-described structure, shown in the drawings, is preferred, it is possible, as mentioned above, to provide variations such as a location of both of the rings in the same plane, although with this latter arrangement the frictional resistance to turning for the rings might be unequal, and of course with this latter construction it would also be necessary to make the annular support 1 thicker and therefore more massive.

It will be understood that each of the elements described above, or two or more together, may also find a useful application in other types of light-controlling structures differing from the types described above.

While the invention has been illustrated and described as embodied in light-controlling structures such as shutters, diaphragms and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a light-controlling structure such as a shutter, diaphragm, or the like for photographic devices, in combination, a plurality of blades for forming an aperture through which light is adapted to pass; support means; and a pair of rotary blade-controlling rings supported by said support means for rotary movement and operatively connected to said blades for controlling the latter to provide a given aperture according to the angular position of said rings one with respect to the other, said rings being located on the same side of said blades, said blades being arranged around the optical axis and said rings being concentric with and surrounding the optical axis and being axially displaced one with respect to the other along the optical axis, said support means having axially displaced bearings respectively supporting said rings, and said rings being located closely adjacent to each other with one of said rings overlapping the other.

2. In a light-controlling structure such as a shutter, diaphragm, or the like for a photographic device, in combination, a plurality of blades for forming an aperture through which light passes along an optical axis about which said blades are arranged, the size of the aperture being determined by the positions of said blades; a pair of rings concentrically surrounding the optical axis and being located adjacent to each other on the same side of said blades, said rings being operatively connected to said blades for controlling the same to provide with said blades an aperture whose size is determined by the angular position of said rings one with respect to the other; and an annular support member also concentrically surrounding the optical axis, said support member being formed with a pair of annular bearing surfaces respectively engaged and surrounded by said rings to support the latter for rotation, said surfaces being concentric with each other and with the optical axis so that they center the rings with respect to each other and with respect to the optical axis, and said surfaces being axially displaced and supporting said rings closely adjacent to each other on one side of said blades with one of said rings overlapping the other.

3. In a light-controlling structure such as a shutter, diaphragm, or the like for photographic devices, in combination, a plurality of aperture-determining blades arranged around an optical axis and located in a plane normal to said axis; a pair of blade-controlling rings concentrically surrounding said axis and located on the same side of said plane adjacent to each other and adjacent to said blades and operatively connected thereto for actuating the same to provide an aperture determined by the angular position of said rings one with respect to the other; an annular support member concentrically surrounding said axis and having a pair of axially displaced annular bearing surfaces respectively engaged by said rings to support the latter for rotation about said axis, one of said rings overlapping the other of said rings and cooperating with the bearing surface which engages said other ring to prevent axial movement of said other ring; and a plate connected to said annular support member and cooperating with said one ring and with the bearing surface of said support member which engages said one ring to prevent axial movement of said one ring.

4. In a light-controlling structure such as a shutter, diaphragm, or the like for photographic devices, in combination, a plurality of aperture-determining blades arranged around an optical axis and located in a plane normal to said axis; a pair of blade-controlling rings concentrically surrounding said axis and located on the same side of said plane adjacent to each other and adjacent to said blades and operatively connected thereto for actuating the same to provide an aperture determined by the angular position of said rings one with respect to the other; an annular support member concentrically surrounding said axis and having a pair of axially displaced annular bearing surfaces respectively engaged by said rings to support the latter for rotation about said axis, one of said rings overlapping the other of said rings and cooperating with the bearing surface which engages said other ring to prevent axial movement of said other ring; and a plate connected to said annular support member and cooperating with said one ring and with the bearing surface of said support member which engages said one ring to prevent axial movement of said one ring, said one ring having radial projections which overlap and engage said other ring.

5. In a light-controlling structure such as a shutter, diaphragm, or the like for photographic devices, in combination, a plurality of aperture-determining blades arranged around an optical axis and located in a plane normal to said axis; a pair of blade-controlling rings concentrically surrounding said axis and located on the same side of said plane adjacent to each other and adjacent to said blades plane and operatively connected thereto for actuating the same to provide an aperture determined by the angular position of said rings one with respect to the other; an annular support member concentrically surrounding said axis and having a pair of axially displaced annular bearing surfaces respectively engaged by said rings to support the latter for rotation about said axis, one of said rings overlapping the other of said rings and cooperating with the bearing surface which engages said other ring to prevent axial movement of said other ring; and a plate connected to said annular support member and cooperating with said one ring and with the bearing surface of said support member which engages said one ring to prevent axial movement of said one ring, said one ring having radial projections which overlap and engage said other ring and said other ring extending radially beyond said one ring.

References Cited by the Examiner
UNITED STATES PATENTS

| | | | |
|---|---|---|---|
| 328,033 | 10/85 | Hitchcock | 95—64 X |
| 761,756 | 6/04 | Brueck | 95—63 |
| 1,612,745 | 12/26 | Riddell | 95—63 |
| 2,890,640 | 6/59 | Noack | 95—63 |
| 2,989,908 | 6/61 | Bolsey | 95—64 |
| 3,005,394 | 10/61 | Schulze | 95—63 |
| 3,089,400 | 5/63 | Kiper | 95—63 |

NORTON ANSHER, *Primary Examiner.*

D. B. LOWE, EMIL G. ANDERSON, *Examiners.*